UNITED STATES PATENT OFFICE.

CHRISTIAN HAMILTON GRAY, OF LONDON, ENGLAND.

PURIFICATION OF INDIA-RUBBER, GUTTA-PERCHA, AND THE LIKE.

1,386,055.   Specification of Letters Patent.   Patented Aug. 2, 1921.

No Drawing.   Application filed March 29, 1921. Serial No. 456,741.

*To all whom it may concern:*

Be it known that I, CHRISTIAN HAMILTON GRAY, a subject of the King of England, residing at London, England, have invented certain new and useful Improvements in the Purification of India-Rubber, Gutta-Percha, and the like, of which the following is a specification.

This invention consists in improvements in or relating to the purification of india rubber, gutta percha, and the like.

Many forms of crude india rubber and gutta percha and also waste vulcanized rubber are contaminated e. g. with mineral matter, such as sand or with metallic or vegetable impurities. Various processes are at present in use for the removal of such impurities. For example, it has been proposed to force gutta percha in a heated and soft state, under pressure, through a fine gauze screen, or a series of such screens, but it is to be noted that a screen, having a mesh as fine as 120 to the linear inch, may allow quite a considerable amount of mineral matter, such as sand, to pass therethrough, as sand commonly occurs in particles of smaller diameter than those which such a screen would keep back. Again, it has been proposed to treat the crude material with a solvent, and to separate the mineral matter from the solution by settlement, centrifuging, filtration, or passing through a fine screen. It is, however, frequently undesirable for various reasons to subject rubber or gutta percha to solution. The object of this invention is the removal from rubber or gutta-percha and the like of the impurities aforesaid.

According to this invention in a process for the purification of india rubber, gutta percha and the like, the material, either in thin sheets or crumb or while undergoing a mechanical operation to expose fresh surfaces, is subjected in the presence of water to the action of hydrofluoric acid. Preferably the india rubber or gutta percha is subjected to such treatment while in the form of plastic dough.

The following are descriptions, by way of example, of methods of carrying this invention into effect.

Crude india rubber or gutta percha, which is contaminated with mineral matter and other extraneous matter, may first be subjected to the known washing processes to remove as great a proportion as possible of the extraneous matter in the known way. The material is then passed between pressure rollers so that it is pressed out into thin sheets or films. These sheets or films are then immersed in a solution of hydrofluoric acid, of a strength varying from 8 to 30 per cent. H. F., according to the size of the sand particles, the permeability of the raw rubber to liquid, and the time of immersion; the most desirable ratio of these factors to one another is determinable by a simple preliminary trial. It cannot be stated beforehand for all raw rubbers and gutta perchas because the natures of these are so different. The thickness of the rubber sheets or films may vary from one thousandth of an inch upward, even to the thickness of commercial crape or smoked sheet.

The material in the sheet or film form after treatment by the hydrofluoric acid as aforesaid, is separated from the hydrofluoric acid solution by decantation, or otherwise, and may afterward be washed with water, or with a dilute aqueous solution of alkali if required, to remove the hydrofluoric acid.

As an example:—

One sample weighing four pounds of plantation crape 0.012 inch thick was recently treated with a 20% aqueous solution of hydrofluoric acid maintained at 100°. C. for four hours, the result being that the silica and other mineral matters soluble in hydrofluoric acid were dissolved, most of them being removed.

Alternatively, the india rubber or gutta percha, after having been washed in the ordinary way, may, at a suitable temperature and in the form of plastic dough, be subjected to a mechanical operation, such as rolling, kneading or otherwise working, in machines such as are generally used for this purpose, so as to expose fresh surfaces while the material is immersed in the solution of hydrofluoric acid.

In one of these machines treating 1 cwt. of material at a time the strength of the hydrofluoric acid solution at 100° C. would be about 15% and the duration of treatment about 2 hours.

In the case of raw rubber or gutta percha containing moisture the hydrofluoric acid can be applied thereto in the gaseous form.

As an example of this mode of treatment:—

One four-pound sample of plantation scrap rubber was given a preliminary washing of the usual known kind, made into a rough sheet about 0.123 inch thick, containing 20% of water. This was subjected for three hours to the action of the gas in excess at atmospheric temperature and pressure and the material after this treatment was washed as before.

Waste vulcanized rubber for treatment according to the present invention is ground into crumbs, and treated in lots of two or three pounds each, moistened with 5% of water, and subjected to the action of hydrofluoric acid gas in excess for about three hours at atmospheric temperature and pressure, and subsequently washed as in the previous examples.

It will be understood that the vessels in which the hydrofluoric acid is contained, and the rollers or other elements in the kneading apparatus which are exposed to the action of hydrofluoric acid, may be composed of, or covered with, suitable protecting material, such as vulcanite.

Successive treatments by hydrofluoric acid may be applied if a single treatment be regarded as insufficient. A second treatment may serve to wash out mineral dissolved in the first.

What I claim as my invention and desire to secure by Letters Patent is:—

A process for the purification of india rubber, gutta percha and the like from sand or other impurities of the kind described in which the material either in thin sheets or crumb or while undergoing a mechanical operation to expose fresh surfaces is subjected in the presence of water to the action of hydrofluoric acid.

In testimony whereof I affix my signature.

CHRISTIAN HAMILTON GRAY.